Figure 1:
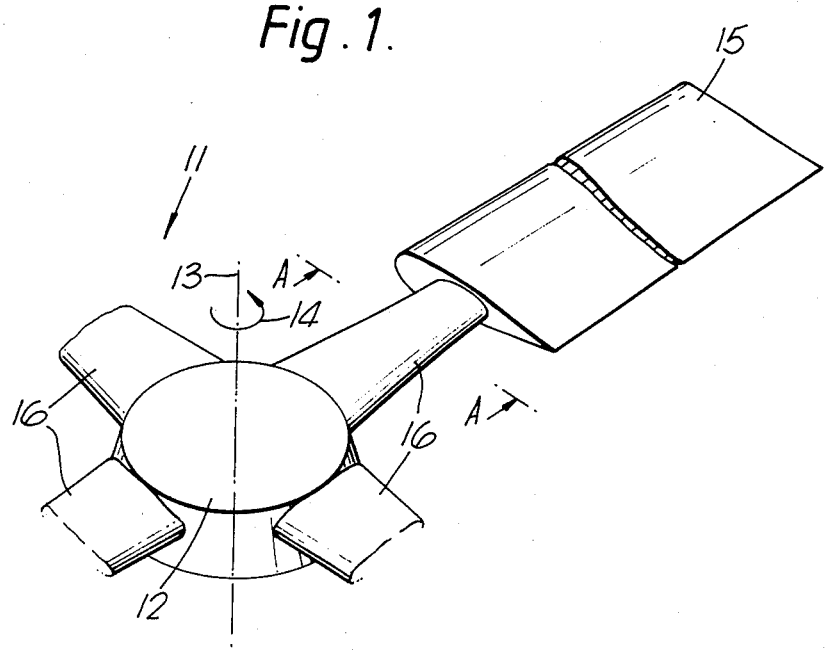

United States Patent [19]
Denison et al.

[11] Patent Number: 4,714,409
[45] Date of Patent: Dec. 22, 1987

[54] HELICOPTER ROTOR

[75] Inventors: Samuel J. M. Denison, Marlow; David P. Bashford, Ruislip, both of England

[73] Assignee: Westland plc, Yeovil, England

[21] Appl. No.: 914,626

[22] Filed: Oct. 2, 1986

[30] Foreign Application Priority Data

Oct. 15, 1985 [GB] United Kingdom ............... 8525342

[51] Int. Cl.$^4$ ............................................. B64C 27/38
[52] U.S. Cl. .................................. 416/134 A; 416/141; 416/2.30
[58] Field of Search ............... 416/134 A, 138 A, 141, 416/230 A, 244

[56] References Cited

U.S. PATENT DOCUMENTS

| | | | |
|---|---|---|---|
| 3,261,407 | 7/1966 | Culver et al. | 416/134 A X |
| 3,384,185 | 5/1968 | Fernandez | 416/134 A |
| 3,669,566 | 6/1972 | Bourquardez et al. | 416/230 A X |
| 3,762,834 | 10/1973 | Bourquardez et al. | 416/134 A |
| 4,111,605 | 9/1978 | Roman et al. | 416/134 A X |
| 4,182,597 | 1/1980 | Derschmidt | 416/134 A |
| 4,345,876 | 8/1982 | Schwarz et al. | 416/134 A |
| 4,349,317 | 9/1982 | Desjardins | 416/134 A |
| 4,352,631 | 10/1982 | Buchs et al. | 416/141 X |
| 4,455,123 | 6/1984 | Sanders et al. | 416/138 A X |
| 4,650,401 | 3/1987 | Yao et al. | 416/134 A |

FOREIGN PATENT DOCUMENTS 2823389 12/1979 Fed. Rep. of Germany ... 416/134 A

Primary Examiner—E. A. Powell, Jr.
Attorney, Agent, or Firm—Larson and Taylor

[57] ABSTRACT

A helicopter rotor includes a plurality of rotor blades attached to a rotor hub by flexure members adapted during operation to permit pitch changes and flap and lag movements of the rotor blades. Each flexure member comprises a plurality of longitudinally extending reinforcing plates which in cross section extend generally radially from a geometric center of the flexure member and are enclosed in a resilient matrix material.

12 Claims, 4 Drawing Figures

HELICOPTER ROTOR

This invention relates to a helicopter rotor.

Proposals have been made to dispense with bearings used conventionally to provide blade pitch change and flap and lag movements of the rotor blades on a helicopter rotor and to provide the required torsional, flapping and lagging freedoms by torsional deflection and bending of a flexure member used to attach the individual rotor blades to a rotor hub.

One such proposal, disclosed in No. GB-A-1313181, utilises a flexure member comprising a plurality of pre-cured fibre-reinforced plastics rods each consisting of a large number of fibre filaments, the rods being embedded in an elastomer material.

The transverse shear rigidity of the flexure member of the prior construction is determined largely by the modulus of the elastomer, and is generally low. This feature when combined with the torsional flexibility required in a helicopter rotor can result in a static torsional/lateral buckling instability under the applied flexural loading encountered during operational movements of the rotor blades of a helicopter rotor. This behaviour may limit significantly the capability of the prior flexure member in its application to a helicopter rotor. An objective of the invention is to provide a flexure member having desirably greater transverse shear rigidity without loss of the required torsional flexibility. A further objective is to provide a flexure member having shear rigidity and flexibility characteristics tailored to application requirements.

Accordingly, this invention provides a helicopter rotor including a rotor hub for rotation about an axis and a plurality of radially extending rotor blades each attached to the rotor hub by an elongated flexure member to permit pitch changes and flap and lag movements of the rotor blade, characterised in that each said flexure member includes a plurality of longitudinally extending reinforcing plates which in cross section of the flexure member extend generally radially from a geometric centre of said flexure member, said reinforcing plates being enclosed in a resilient matrix material.

The reinforcing plates may be arranged in diametrically opposed pairs and may be distributed uniformly around said geometric centre.

Preferably each of said reinforcing plates comprises a pre-cured fibre reinforced laminate having a plurality of pre-impregnated fibre layers embedded in a matrix material. The fibres may be unidirectional fibres and may be arranged with some of the layers extending generally parallel to the longitudinal axis of the reinforcing plate and the fibres of other layers extending at ±45 degrees to the longitudinally extending fibres. The reinforcing plate matrix material may comprise a thermo-setting epoxy resin. Each reinforcing plate may taper downwardly in thickness from an outer edge.

The resilient matrix material may comprise an elastomer material.

A longitudinally extending aperture concentric with said geometric centre of the flexure member may be provided throughout substantially the entire length thereof.

Preferably the flexure member is elliptical in cross section with the minor axis aligned with the direction of flap movement of the rotor blade. Both of the minor and major axes may taper inwardly with increasing radial distance from the axis of rotation.

The flexure members may be formed integral with the rotor hub or with their respective rotor blades or with both the hub and the blades.

Figure 2:
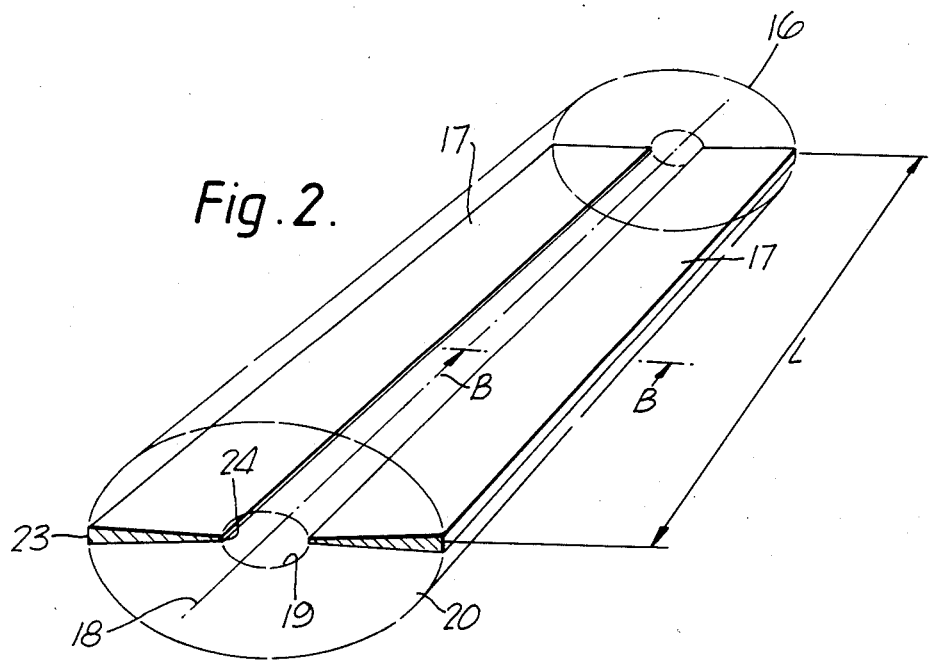
Figure 3:
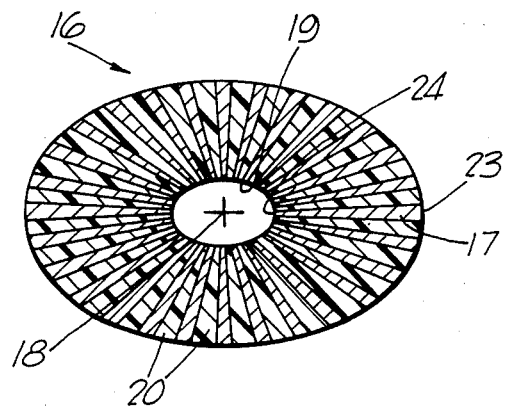
Figure 4:
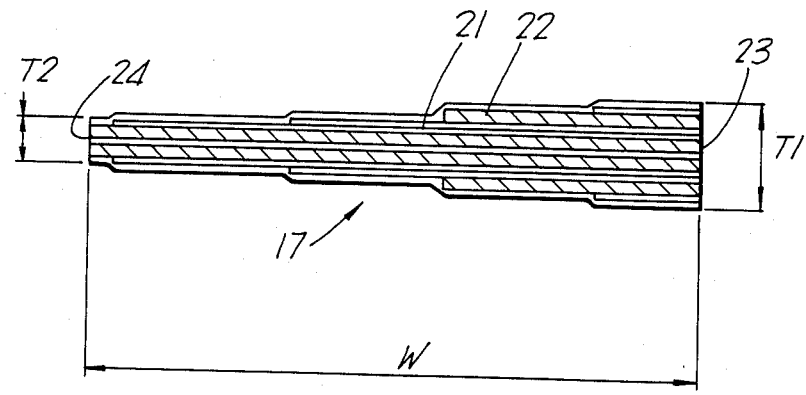

The invention will now be described by way of example only and with reference to the accompanying drawings in which, FIG. 1 is a fragmentary perspective illustration of a helicopter rotor constructed according to the invention, FIG. 2 is a fragmentary perspective illustration in simplified form of the flexure member of the rotor of FIG. 1, FIG. 3 is a cross sectional view taken along lines A—A of FIG. 1, and FIG. 4 is a sectioned view taken on lines B—B of FIG. 2.

A helicopter rotor 11 includes a rotor hub 12 for rotation during operation about an axis 13 in the direction of arrow 14. Four rotor blades 15 (one only being shown) extend radially from rotor hub 12 and are attached thereto by elongated flexure members 16. Pitch change means (not shown) are provided to change the pitch of the rotor blades 15.

Each of the flexure members 16 is elliptical in cross section and is arranged with its minor axis aligned with the direction of flap movement of its associated rotor blade 15, i.e. in a plane perpendicular to the plane of rotation. The flexure member 16 is tapered with both the minor and major axes reducing dimensionally with increasing radial distance from the axis of rotation.

In the illustrated embodiment the rotor hub 12, blades 15, and flexure members 16, are formed as an integral assembly.

FIG. 2 is a perspective generally schematic illustration of one of the flexure members 16 shown in simplified form in order to explain the features of the invention.

Thus, the flexure member 16 includes a plurality of longitudinally extending reinforcing plates 17 of length L which in cross section extend radially from a geometric centre of the flexure member 16 that is coincident with a longitudinal axis 18. The reinforcing plates 17 are arranged in diametrically opposed pairs (one pair only being shown in FIG. 2) separated by a central aperture 19 coincident with axis 18, and taper downwardly and inwardly from thickness T1 of outer edge 23 to thickness T2 of inner edge 24 at the surface of the aperture 19. The width W of each reinforcing plate 17 is generally equal to the length of the radial plane of the flexure member in which it lies and, in the illustrated embodiment tapers downwardly and inwardly with increasing distance from the axis of rotation 13.

The reinforcing plates 17 are retained and located in a resilient matrix material 20, preferably an elastomer.

Referring now to FIG. 3, the flexure member 16 of the rotor 11 of FIG. 1 comprises fourteen diametrically opposed pairs of reinforcing plates 17, making twenty-eight reinforcing plates 17 in total, each extending radially from axis 18. The plates 17 are uniformly located around axis 18 and are interspersed with layers of the elastomer 20.

As shown in FIG. 4, each of the reinforcing plates 17 comprises a pre-cured laminate consisting of a plurality of superimposed unidirectional carbon fibre layers pre-impregnated with a thermo-setting resin. The unshaded areas 21 of FIG. 4 each comprise two layers arranged with the fibres extending generally parallel to the longitudinal axis of the plate 17 and the shaded areas 22 each comprise four layers with the fibres extending alternately at ±45 degrees to the fibres of layers 21.

The carbon fibre layers are progressively reduced in width from the outer edge 23 to provide the tapered configuration for the reinforcing plate 17 which, in the illustrated embodiment, has a thickness T1 corresponding to that of thirty-four carbon fibre layers at the outer edge 23 and a thickness T2 corresponding to that of fourteen carbon fibre layers at the inner edge 24.

Thus, the helicopter rotor of this invention is characterised by a flexure member 16 having a plurality of radially orientated reinforcing plates 17, which provide a transverse shear rigidity substantially greater than that of the aforementioned prior art device whilst maintaining the low torsional rigidity required for pitch change movements.

The greater transverse shear rigidity results in improved flexural behaviour and particularly in a substantially enhanced static structural stability which is very important in a helicopter rotor application because of the severe flexural loadings which occur in consequence of operational deflections of the rotor blades in flap and lead/lag planes.

An increase in the number of layers of cross plied (e.g. ±45 degrees) fibres in the reinforcing plates 17, will increase the transverse shear rigidity of the flexure member 16 and conversely, but such changes will have a minimal effect on the torsional rigidity.

The elliptical cross sectional shape permits tailoring of the flexural stiffness characteristics of the flexure member 16 to provide the necessary operational difference between the required movements of the rotor blades in the flap and lead/lag planes. The flexure member 16 is compact and aerodynamically clean resulting in low aerodynamic drag.

Whilst one embodiment of the invention has been described and illustrated, it will be apparent that many modifications can be made without departing from the scope of the invention. Thus, instead of the fully integral arrangement of the illustrated embodiment, the flexure member 16 could be formed integral with either the rotor hub or the rotor blade alone or entirely separately, and with suitable attachment means provided at one or both ends as necessary. Suitable attachment(s) may be formed by increasing the width of the individual reinforcing plates 17 at the end(s) of the flexure member 16 so as to dispense locally with the elastomer layers 20 whereby an effective "solid" section is formed at the end(s) to provide for bolted or clamped attachment. The width of a reinforcing plate 17 may be less than the length of the radial plane of the flexure member 16 in which it lies. Any other suitable fibre reinforced materials could be used, for example materials such as a glass fibre/epoxy composite may provide a useful increase in the strength of the reinforcing plates 17, and a thermoplastics matrix material may replace the described thermo-setting material. Alternatively the reinforcing plates 17 could be made of metal. Different numbers of reinforcing plates 17 can be used depending on required operational characteristics, and other cross sectional shapes such as circular may be adopted, in which case the required difference in the stiffness characteristics between the flap and lead/lag planes may be obtained by a non-uniform orientation of the reinforcing plates 17. The overall fibre volume content of flexure member 16 can be adjusted by incorporating fibres in the spacing elastomer layers 20. The central aperture 19 eases manufacture of the flexure member 16, but is not essential operationally and may either be dispensed with during manufacture or filled maybe with an elastomer infill after manufacture.

What is claimed is:

1. A helicopter rotor including a rotor hub for rotation about an axis and a plurality of radially extending rotor blades each attached to the hub by an elongated flexure member to permit pitch changes and flap and lag movements of the attached rotor blade, wherein each flexure member includes a plurality of longitudinally extending reinforcing plates which in cross section extend generally radially for 360° around a geometric centre of the flexure member, said reinforcing plates being enclosed in a resilient matrix material.

2. A rotor as claimed in claim 1, wherein said reinforcing plates are arranged in diametrically opposed pairs.

3. A rotor as claimed in claim 1, wherein said reinforcing plates are distributed uniformly around said geometric centre.

4. A rotor as claimed in claim 1, wherein reinforcing plate comprises a pre-cured fibre reinforced laminate including a plurality of pre-impregnated fibre layers embedded in a matrix material.

5. A rotor as claimed in claim 4, wherein the fibres of the fibre layers are unidirectional fibres.

6. A motor as claimed in claim 5, wherein the fibres of some layers extend generally parallel to the longitudinal axis of the reinforcing plate and the fibres of other layers extend at ±45 degrees to the longitudinally extending fibres.

7. A rotor as claimed in claim 4 wherein the reinforcing plate matrix material is a thermo-setting epoxy resin.

8. A rotor as claimed in claim 1, wherein each reinforcing plate tapers downwardly in thickness from an outer edge.

9. A rotor as claimed in claim 1, wherein the resilient matrix material comprises an elastomer.

10. A rotor as claimed in claim 1, wherein the flexure member is elliptical in cross section and arranged with the minor axis aligned with the direction of flap movement of the rotor blade.

11. A rotor as claimed in claim 10, wherein the flexure member is tapered with both the minor and major axes reducing dimensionally with increasing radial distance from the axis of rotation.

12. A rotor as claimed in claim 1, wherein the flexure member is formed integral with the rotor hub.

* * * * *